US009264882B2

(12) United States Patent
Miyagawa et al.

(10) Patent No.: US 9,264,882 B2
(45) Date of Patent: Feb. 16, 2016

(54) SERVICE CONTROL APPARATUS, RELAY APPARATUS, FEMTOCELL BASE STATION, COMMUNICATION SYSTEM, CONTROL METHOD AND PROGRAM

(75) Inventors: Yusuke Miyagawa, Minato-ku (JP); Takayuki Kido, Minato-ku (JP); Takuo Akimoto, Minato-ku (JP); Osamu Kurokawa, Minato-ku (JP); Yuki Nakanishi, Minato-ku (JP); Yasuhiro Watanabe, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/982,422

(22) PCT Filed: Jun. 22, 2012

(86) PCT No.: PCT/JP2012/065964
§ 371 (c)(1),
(2), (4) Date: Jul. 29, 2013

(87) PCT Pub. No.: WO2012/176870
PCT Pub. Date: Dec. 27, 2012

(65) Prior Publication Data
US 2013/0310028 A1 Nov. 21, 2013

(30) Foreign Application Priority Data

Jun. 23, 2011 (JP) .................. 2011-139453

(51) Int. Cl.
*H04W 8/02* (2009.01)
*H04W 8/06* (2009.01)
*H04W 36/00* (2009.01)
*H04W 60/00* (2009.01)
*H04W 84/04* (2009.01)

(52) U.S. Cl.
CPC .......... *H04W 8/02* (2013.01); *H04W 8/06* (2013.01); *H04W 36/0022* (2013.01); *H04W 60/00* (2013.01); *H04W 84/045* (2013.01)

(58) Field of Classification Search
None
See application file for complete search history.

(56) References Cited

U.S. PATENT DOCUMENTS

2008/0305792 A1 12/2008 Khetawat et al.
2009/0111427 A1* 4/2009 Mack et al. ................... 455/411
2010/0150071 A1 6/2010 Takubo

FOREIGN PATENT DOCUMENTS

EP     2384036 A1   11/2011
JP     2009-504049 A  1/2009

(Continued)

OTHER PUBLICATIONS

Communication dated Apr. 13, 2015 from the European Patent Office in counterpart application No. 12802032.8.

(Continued)

*Primary Examiner* — Charles Appiah
*Assistant Examiner* — Margaret G Mastrodonato
(74) *Attorney, Agent, or Firm* — Sughrue Mion, PLLC

(57) ABSTRACT

In order to enable a communication system introduced with a femtocell base station using an IMS network, to perform PS service similar to that of the existing 3G network, a service control apparatus (SGSN functional unit), based on the UE's message transmitted to the femtocell base station (FAP), acquires UE's subscriber information for PS (Packet Switching) service, from a HLR and registers the subscriber information in a VLR that is present on the IMS network. Then, service control apparatus performs PS service based on the subscriber information registered in the VLR.

8 Claims, 10 Drawing Sheets

(56) References Cited

FOREIGN PATENT DOCUMENTS

| | | |
|---|---|---|
| JP | 2010-252139 A | 11/2010 |
| JP | 2011-502399 A | 1/2011 |
| JP | 2009-504051 A | 1/2013 |
| WO | 2006/031927 A2 | 3/2006 |
| WO | 2009/054901 A2 | 4/2009 |
| WO | 2010/074033 A1 | 7/2010 |
| WO | 2010/119832 A1 | 10/2010 |
| WO | WO 2011083065 A1 * | 7/2011 |

OTHER PUBLICATIONS

Communication dated Nov. 27, 2015 from the State Intellectual Property Office of the P.R.C. in counterpart application No. 201280012598.5.

* cited by examiner

Fig.7

| APN received from UE | APN in Subscriber information | | |
|---|---|---|---|
| | General | Prepaid | |
| | | Subscribers of Particular Service A | Subscribers of Particular Service B |
| | All Subscribers | Subscribers A, B, C | Subscribers A, D, E |
| Subscriber A | ○ | ○ | ○ |
| Subscriber B | ○ | ○ | × |
| Subscriber E | ○ | × | ○ |
| Subscriber H | ○ | × | × |

○:Permitted
×:Restrained by APN-Selection

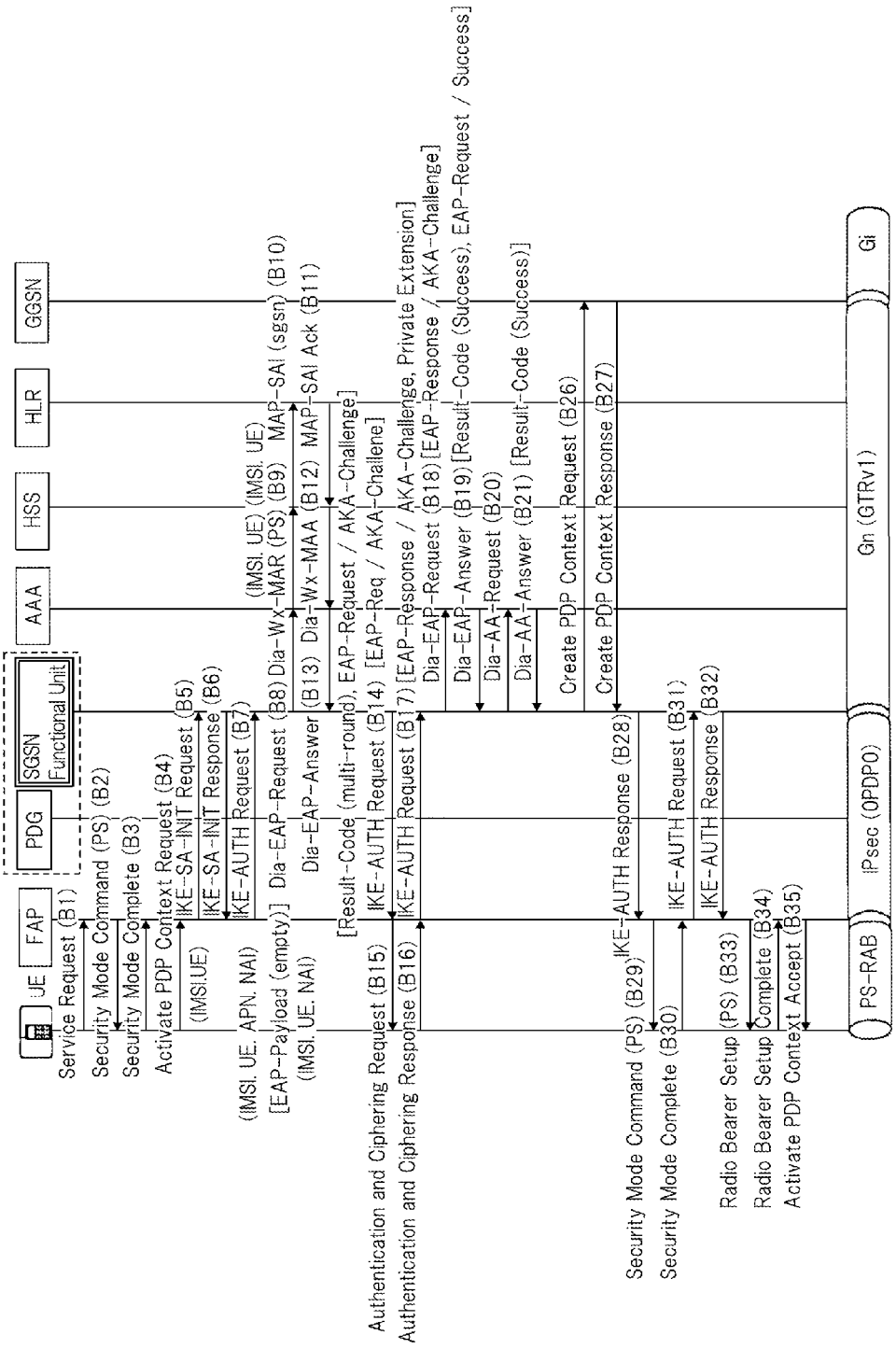

SERVICE CONTROL APPARATUS, RELAY APPARATUS, FEMTOCELL BASE STATION, COMMUNICATION SYSTEM, CONTROL METHOD AND PROGRAM

CROSS REFERENCE TO RELATED APPLICATIONS

This is a National Stage of International Application No. PCT/JP2012/065964, filed Jun. 22, 2012, claiming priority from Japanese Patent Application No. 2011-139453, filed Jun. 23, 2011, the contents of all of which are incorporated herein by reference in their entirety.

TECHNICAL FIELD

The present invention relates to a technology of performing communication using a femtocell base station.

BACKGROUND ART

Recently, in order to improve the quality of a communication area, a communication system using femtocell base stations has been developed (see, e.g., patent documents 1 and 2).

A femtocell base station is a small radio base station that covers a narrow communication area of some tens meters in radius. The femtocell base station is installed inside a room such as a house, office or the like, in order to cover the communication area inside the room. Use of a femtocell base station makes it possible to improve the communication quality of a communication area that cannot be covered by existing microcell base stations. It is also possible to cover the communication area without incurring costs for installing an infrastructure for microcell base stations.

Further, in recent years, various kinds of products for realizing All-IP networks have been developed. For example, systems have been developed that can accommodate new LTE (Long Term Evolution) networks as well as existing 3G networks defined in 3GPP and further that can accommodate diverse access networks such as WLAN, WiMAX, 3GPP2 and the like.

As a related art document filed by the applicant hereof, for example, patent document 3 (JP2010-252139A) discloses a communication system that is introduced with a femtocell base station using an IMS (IP Multimedia subsystem) network.

The above patent document 3 discloses a scheme in which the subscriber information on a subscriber user (UE) that is managed by the femtocell base station (FAP) is dynamically modified in accordance with the existing position of the subscriber user (UE).

RELATED ART DOCUMENT

Patent Document

Patent Document 1 JP 2009-504049A, publication
Patent Document 2 JP 2009-504051A, publication
Patent Document 3 JP2010-252139A, publication

SUMMARY OF THE INVENTION

Problems to be Solved by the Invention

The IMS network is an architecture, mainly for CS (Circuit Switching) service. Therefore, in order to realize PS (Packet Switching) service in the communication system (Femto IMS network) introduced with a femtocell base station using an IMS network, it is necessary to refer to subscriber information (for PS) registered at HLR (Home Location Register). In other words, in the communication system introduced with a femtocell base station using an IMS network, it is the existing status that a PS additional service that uses subscriber information (for PS) registered in VLR (Visitors Location Register) at a SGSN (Service GPRS Support Node) cannot be provided like the existing 3G networks. The PS additional service means a service which SGSN provides among PS services standardized in 3GPP, using subscriber information (for PS) acquired from HLR.

From the above viewpoint, development of a scheme in which PS service similar to that of the existing 3G networks can be performed in the communication system introduced with a femtocell base station using an IMS network, has been demanded.

In view of the above circumstances, it is an object of the present invention to provide a service control apparatus, a relay apparatus, a femtocell base station, a communication system, a control method and a program, which can perform PS service similar to that of the existing 3G networks in a communication system introduced with a femtocell base station using an IMS network.

In order to achieve the above object, the present invention has the features follows:

<Service Control Apparatus>

A service control apparatus of the present invention comprising:

a registering means that acquires subscriber information for PS (Packet Switching) service on a UE (User Equipment) that is in the area covered by a femtocell base station on an IMS (IP Multimedia subsystem) network, from a HLR (Home Location Register) and registers the subscriber information to a VLR (Visitor Location Register) that is present on the IMS network; and a control means that performs PS service based on the subscriber information registered in the VLR.

<Relay Apparatus>

A relay apparatus of the present invention is a relay apparatus for relaying a message from a UE (User Equipment) that is in the area covered by a femtocell base station on an IMS (IP Multimedia subsystem) network, to the core side, comprising:

a registering means that acquires subscriber information for PS (Packet Switching) service on the UE, from a HLR (Home Location Register) and registers the subscriber information to a VLR (Visitor Location Register) that is present on the IMS network; and a control means that performs PS service based on the subscriber information registered in the VLR.

<Femtocell Base Station>

A femtocell base station of the present invention is a femtocell base station that is present on an IMS (IP Multimedia subsystem) network and transmits a message from a UE (User Equipment) to the core side, comprising:

a registering means that acquires subscriber information for PS (Packet Switching) service on the UE, from a HLR (Home Location Register) and registers the subscriber information to a VLR (Visitor Location Register) that is present on the IMS network.

<Communication System>

A communication system of the present invention is a communication system forming an IMS network, including: a UE (User Equipment); a femtocell base station that transmits a message from the UE to the core side; a relay apparatus that relays the UE's message transmitted from the femtocell base station to the core side; and a service control apparatus that performs PS (Packet Switching) service for the UE, the service control apparatus comprises:

a registering means that acquires subscriber information for PS service on the UE from a HLR (Home Location Register), based on the UE's message transmitted from the femtocell base station, and registers the subscriber information to a VLR (Visitor Location Register) that is present on the IMS network; and a control means that performs PS service based on the subscriber information registered in the VLR.

<Control Method>

A control method of the present invention is a control method performed by a service control apparatus that performs PS (packet Switching) service for a UE (User Equipment) that is present in the area covered by a femtocell base station on an IMS (IP Multimedia subsystem) network, comprises the steps of:

a registering step of acquiring subscriber information for PS service on the UE and registering the subscriber information to a VLR (Visitor Location Register) that is present on the IMS network; and a control step of performing PS service based on the subscriber information registered in the VLR.

<Program>

A program of the present invention is a program that causes a computer to execute:

a registering process of acquiring subscriber information for PS (Packet Switching) service on a UE (User Equipment) that is present in the area covered by a femtocell base station on an IMS (IP Multimedia subsystem) network, from a HLR (Home Location Register) and registering the subscriber information to a VLR (Visitor Location Register) that is present on the IMS network; and a control process of performing PS service based on the subscriber information registered in the VLR.

Effect of the Invention

According to the present invention, it is possible to perform a PS service similar to that of the existing 3G networks, even in a communication system introduced with a femtocell base station that uses an IMS network.

BRIEF DESCRIPTION OF THE DRAWINGS

FIG. 7 is a diagram for illustrating an APN-Selection function as one example of PS additional service.

FIG. 10 is a diagram showing an example of a PS service processing operation on a Femto IMS network of the third exemplary embodiment, showing an example of a processing operation when UE is a PS-dedicated device.

EXEMPLARY EMBODIMENTS

Outline of a Communication System of the Present Exemplary Embodiment

To begin with, the outline of a communication system according to the present invention will be described with reference to FIG. 2.

Figure 2:
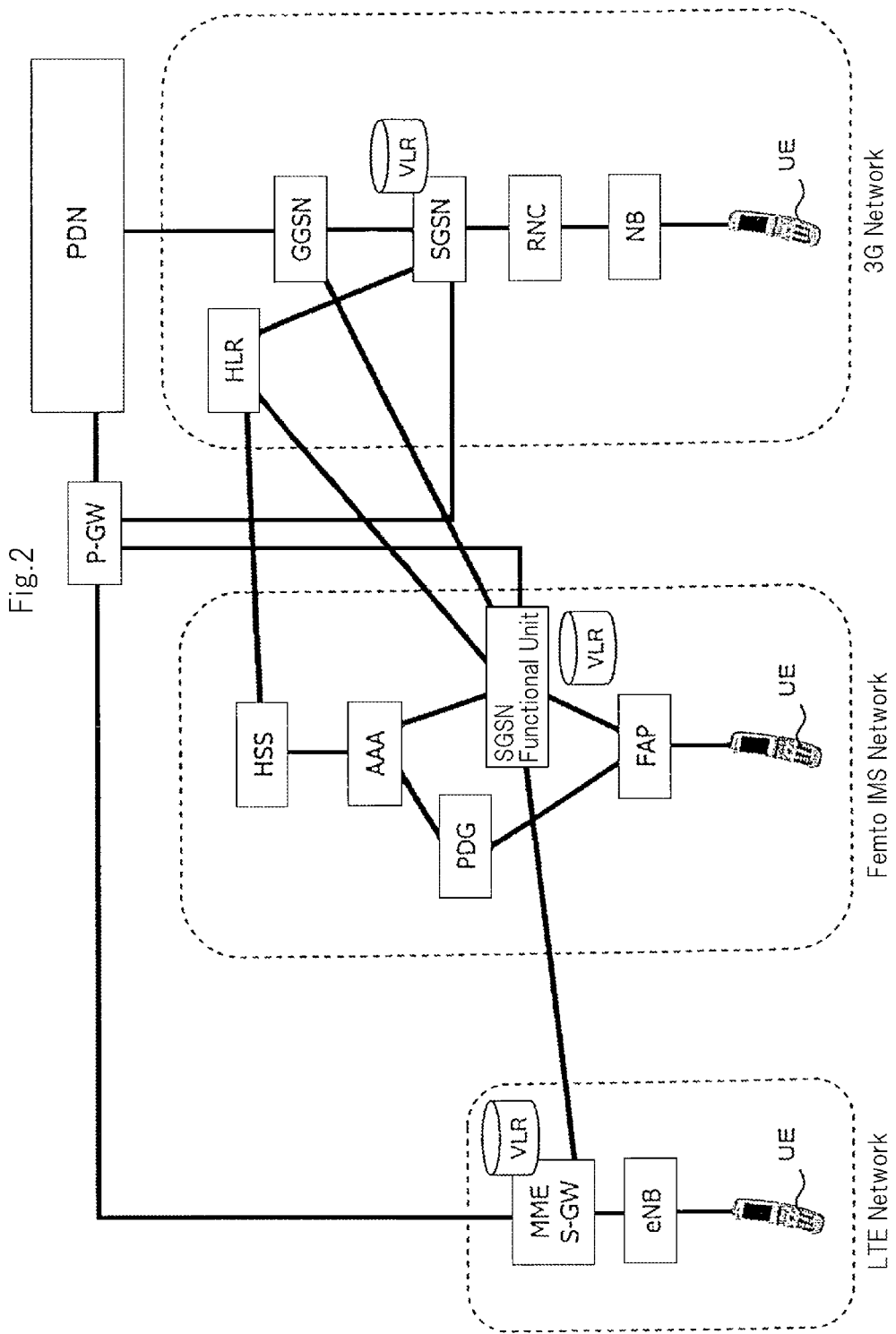
FIG. 2 is a second diagram showing a system configuration example of the communication system of the first exemplary embodiment of the present invention, showing a specific configurational example of a SGSN functional unit that forms a Femto IMS network.

FIG. 2 is a communication system that forms an IMS network, including: a UE (User Equipment), a femtocell base station (Femto Access Point: FAP) that transmits a UE's message to the core side; a relay apparatus (Packet Data Gateway: PDG) that relays UE's message transmitted from femtocell base station FAP to the core side; and a service control apparatus (Serving GPRS Support Node functional unit: SGSN functional unit) that performs PS (Packet Switching) service for UE.

The service control apparatus (SGSN functional unit) of the present exemplary embodiment acquires UE's subscriber information for PS service from HLR (Home Location Register) based on UE's message transmitted from femtocell base station FAP and registers the information in VLR (Visitor Location Register) that is present on the IMS network. Then, the service control apparatus performs PS service based on the subscriber information registered in VLR. As a result, it is possible also in the communication introduced with a femtocell base station that uses an IMS network to perform the PS service similar to that of the existing 3G network, even in the communication introduced with a femtocell base station that uses an IMS network. Now, the communication system of the present exemplary embodiment will be described in detail with reference to the accompanying drawings.

First Exemplary Embodiment

System Configuration Example of Communication System

Figure 1:
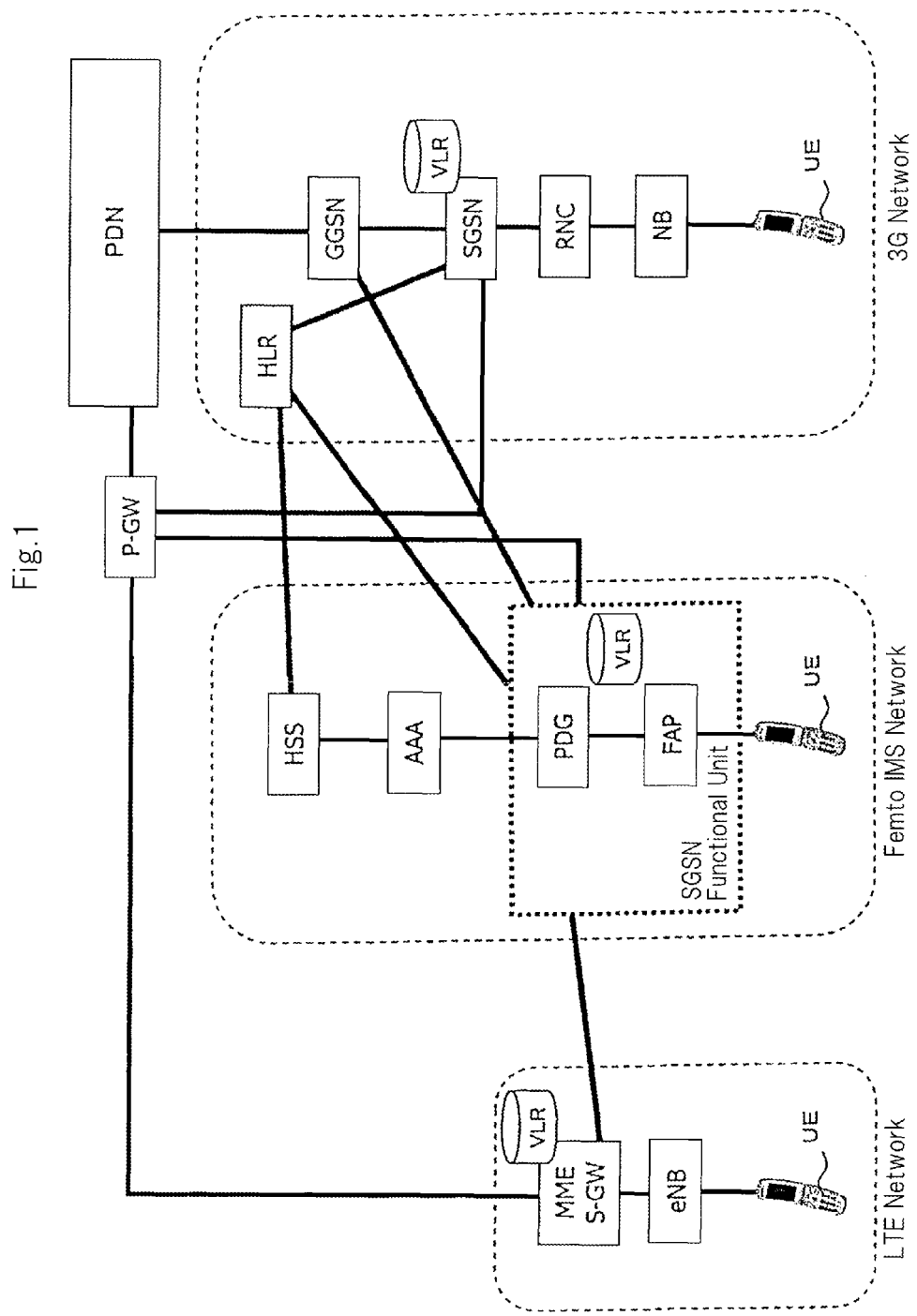
FIG. 1 is a first diagram showing a system configuration example of a communication system of the first exemplary embodiment of the present invention.

Referring to FIG. 1, a system configuration example of a communication system of the first exemplary embodiment of the present invention will be described.

The communication system of the present exemplary embodiment includes a 3G network, a Femto IMS (IP Multimedia subsystem) network and a LTE (Long Term Evolution) network.

The 3G network is a publicly known existing 3G network, and forms a Macro network. The existing 3G network includes UE (User Equipment), NB (Node-B), RNC (Radio Network Controller), SGSN (Serving GPRS Support Node), GGSN (Gateway GPRS Support Node), VLR (Visitors Location Register) and HLR (Home Location Register).

Since UE, NB, RNC, SGSN, GGSN, VLR and HLR that form the 3G network are equipment that perform processing based on 3GPP, a specific processing operation example is omitted. The technologies used in the existing 3G network are disclosed in, for example, 3GPP TS 23.060 V8.5.1 (2009-06) and others.

The LTE network is a publicly known existing LTE network, including UE, eNB (eNode-B), MME S-GW (Mobility Management Entity Serving-Gateway) and VLR.

Since UE, eNB, MME S-GW and VLR that form the LTE network are equipment that perform processing based on 3GPP, the specific processing operation example is omitted. The technologies used in the existing LTE network are disclosed in, for example, 3GPP TS 23.060 V8.5.1 (2009-06) and others.

The Femto IMS network includes UE, FAP (Femto Access Point), PDG (Packet Data Gateway), VLR, AAA (Authentication Authorization Accounting) and HSS (Home Subscriber Server).

FAP is a small radio base station that covers a narrow communication area of some tens meters in radius.

PDG is an apparatus that securely relays messages.

VLR is an apparatus that stores subscriber information (for PS) on UEs registered on HLR. In the Femto IMS network of the present exemplary embodiment, subscriber information (for PS) is registered in VLR that is present on the Femto IMS network, and PS service similar to that of the existing 3G network is performed based on the subscriber information (for PS).

AAA is an apparatus that performs an authentication process between UE and the network.

HSS is an apparatus that manages the subscriber information (for CS) on UEs used on the Femto IMS network. HSS acquires UE's subscriber information (for CS) from HLR, and manages the acquired UE's subscriber information (for CS).

The Femto IMS network of the present exemplary embodiment virtually forms a SGSN functional unit using FAP and PDG shown in FIG. 1, and acquires the UE's subscriber information (for PS) from HLR. Further, the Femto IMS network of the present exemplary embodiment registers the acquired UE's subscriber information (for PS) in VLR that is present on the Femto IMS network, and makes it possible to provide PS additional service similar to that of 3G network. The PS additional service means a PS service which SGSN provides among PS services standardized in 3GPP, using subscriber information (for PS) acquired from HLR. Further, the Femto IMS network of the present exemplary embodiment connects the SGSN functional unit and the MME S-GW to realize an interface with an LTE network.

As a configurational example that forms the SGSN functional unit on the Femto IMS network, a configurational example shown in FIG. 2 can be considered. In the system configuration shown in FIG. 2, the SGSN functional unit is provided between FAP and AAA. The SGSN functional unit is directly connected to HLR on the 3G network, and acquires UE's subscriber information (for PS) from HLR and registers the information in VLR so as to be able to perform PS service based on the subscriber information (for PS) registered in VLR. Further, the SGSN functional unit is directly connected to MME S-GW on the LTE network, GGSN on the 3G network and P-GW so as to enable the SGSN functional unit on the Femto IMS network to be recognized similarly to SGSN on the 3G network, by MME S-GW, GGSN and P-GW.

On the Femto IMS network of the present exemplary embodiment, messages are transmitted and received between UE, FAP, PDG, AAA, HSS and HLR to perform UE authentication process. Further, when authentication of UE has succeeded, messages are transmitted and received between UE, FAP, PDG, CSCF (Call Session Control Function) (not shown), HSS and HLR on the Femto IMS network of the present exemplary embodiment, and the UE's subscriber information (for CS) managed in HLR is transferred to HSS and CSCF so as to register the UE's subscriber information (for CS) into HSS and CSCF. This procedure makes it possible for the Femto IMS network of the present exemplary embodiment to perform a process for authenticating UE via FAP upon location registration for CS service, to register the UE's subscriber information (for CS) registered in HLR in VLR of HSS and CSCF, and to thereby perform CS service based on the subscriber information (for CS) on the UE.

Further, on the Femto IMS network of the present exemplary embodiment, messages are transmitted and received between UE, FAP, PDG, AAA, HSS and HLR to perform a process for authenticating UE. Further, when authentication of UE has succeeded, messages are transmitted and received between UE, FAP, SGSN functional unit, AAA, HSS and HLR on the Femto IMS network of the present exemplary embodiment, and the UE's subscriber information (for PS) managed in HLR is transferred to the SGSN functional unit so as to register the UE's subscriber information in VLR. This procedure makes it possible for the Femto IMS network of the present exemplary embodiment to perform a process for authenticating UE via FAP upon location registration for PS service, to register the UE's subscriber information (for PS) registered in HLR in VLR of the SGSN functional unit, and to thereby perform PS service based on the subscriber information (for PS) on the UE.

<Processing Operation Example of the Communication System>

Next, a processing operation example of the communication system of the present exemplary embodiment will be described with reference to FIGS. 2 to 5.

<PS Service in Existing 3G Network>

Figure 3:
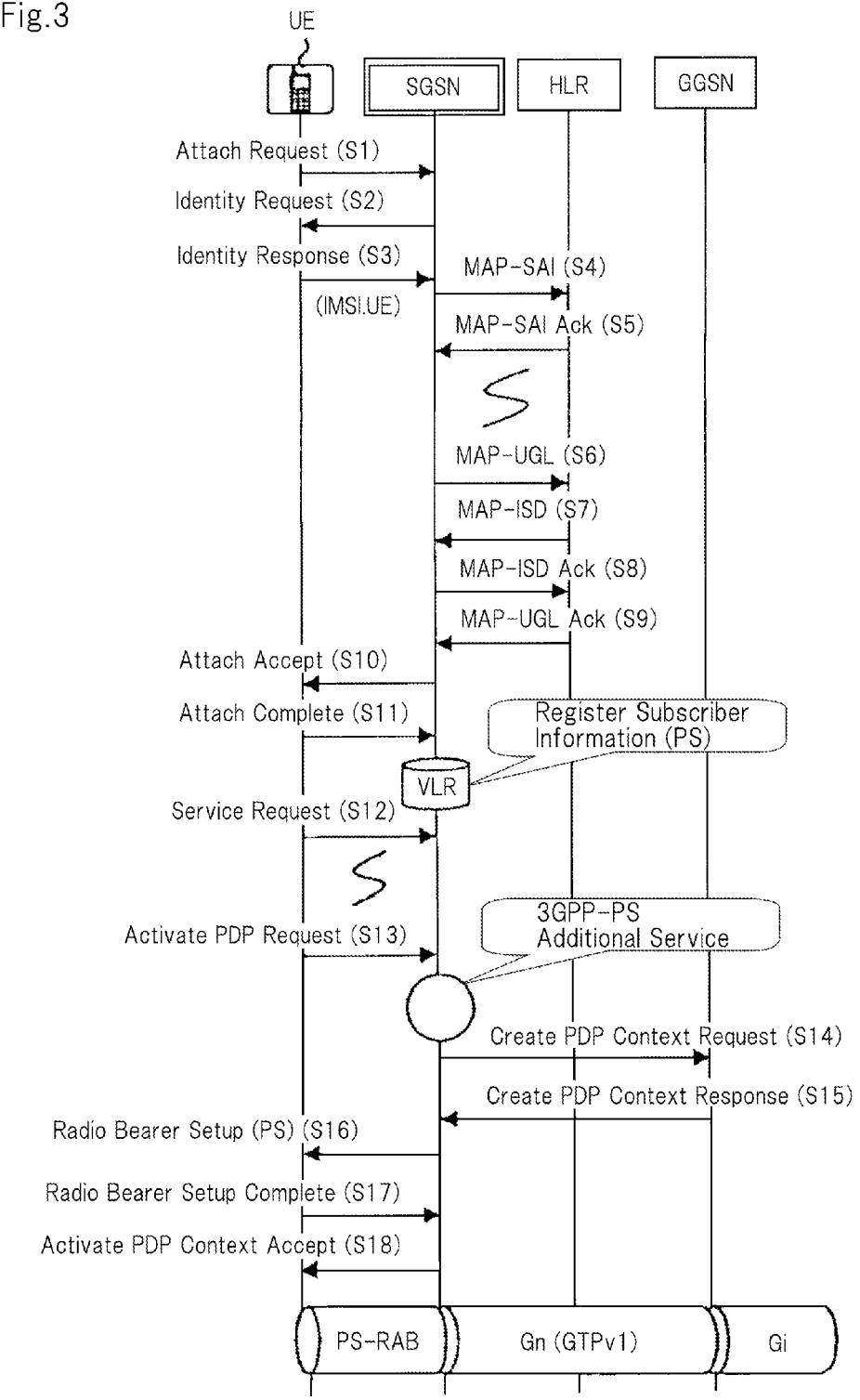
FIG. 3 is a diagram showing an example of a PS service processing operation on an existing 3G network.

Referring first to FIGS. 2 and 3, PS (Packet Switching) service performed on the existing 3G network will be described.

UE transmits Attach Request to SGSN (Step S1).

When receiving Attach Request, SGSN transmits Identity Request to UE (Step S2).

When receiving Identity Request, UE transmits Identity Response to SGSN(Step S3).

When receiving Identity Response, SGSN transmits MAP-Send Authentication Information (MAP-SAI) to HLR (Step S4).

When receiving MAP-SAI, HLR transmits MAP-SAI Ack to SGSN (Step S5).

In the procedures from the above Step S1 to Step S5, the process for authenticating UE is performed between UE, SGSN and HLR.

When the authentication process of UE is completed, SGSN transmits MPA-Update GPRS Location (MAP-UGL) to HLR (Step S6).

When receiving MAP-UGL, HLR transmits MAP-Insert Subscriber Data (MAP-ISD) to SGSN (Step S7).

When receiving MAP-ISD, SGSN transmits MAP-ISD Ack to HLR (Step S8).

When receiving MAP-ISD Ack, HLR transmits MAP-UGL Ack to SGSN (Step S9).

When receiving MAP-UGL Ack, SGSN transmits Attach Accept to UE (Step S10).

When receiving Attach Accept, UE transmits Attach Complete to SGSN (Step S11). With the above procedures, SGSN can register the UE's subscriber information (for PS) acquired from HLR in VLR and manage the information.

Next, UE transmits Service Request to SGSN (Step S12). After transmission of Service Request, various kinds of information are exchanged between UE and SGSN, and UE transmits Activate PDP Request to SGSN (Step S13).

When receiving Activate PDP Request, SGSN transmits Create PDP Context Request to GGSN, based on the subscriber information (for PS) registered in VLR (Step S14).

When receiving Create PDP Contest Request, GGSN transmits Create PDP Context Response to SGSN (Step S15).

When receiving Create PDP Context Response, SGSN transmits Radio Bearer Setup (PS) to UE (Step S16).

When receiving Radio Bearer Setup (PS), UE transmits Radio Bearer Setup Complete to SGSN (Step S17).

When receiving Radio Bearer Setup Complete, SGSN transmits Activate PDP Context Accept to UE (Step S18).

In this way, in the existing 3G network, when receiving Attach Request from UE, SGSN acquires the UE's subscriber information (for PS) from HLR and manages the acquired UE's subscriber information (for PS) at VLR. Then, when receiving Activate PDP Request from UE, SGSN performs 3GPP-PS additional service based on the UE's subscriber information (for PS) managed at VLR.

<PS Service on IMS-Femto Network>

Figure 4:
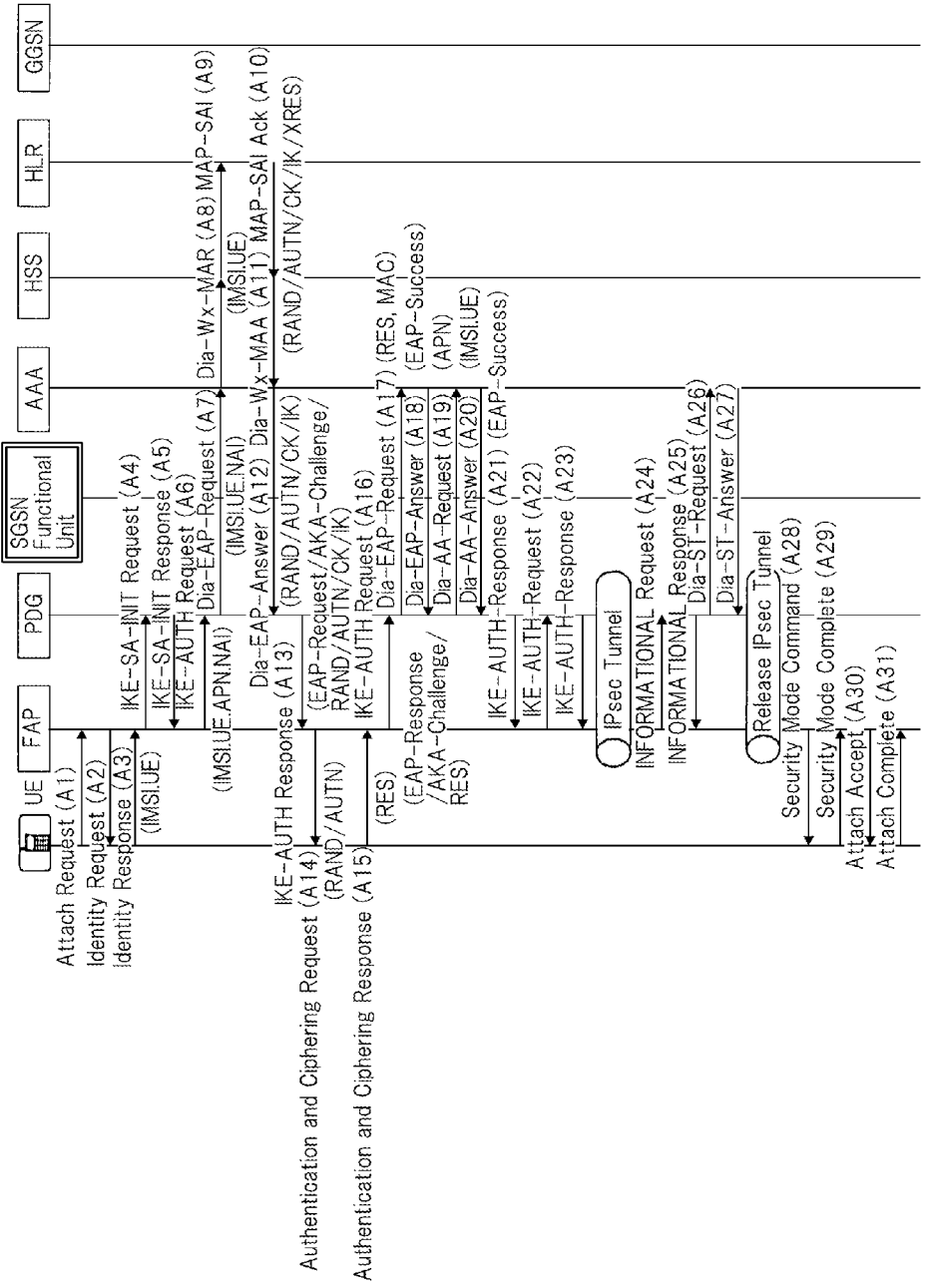
FIG. 4 is a diagram showing an example of a PS service processing operation on a Femto IMS network, showing an example of a processing operation at the time of performing location registration for PS service.
Figure 5:
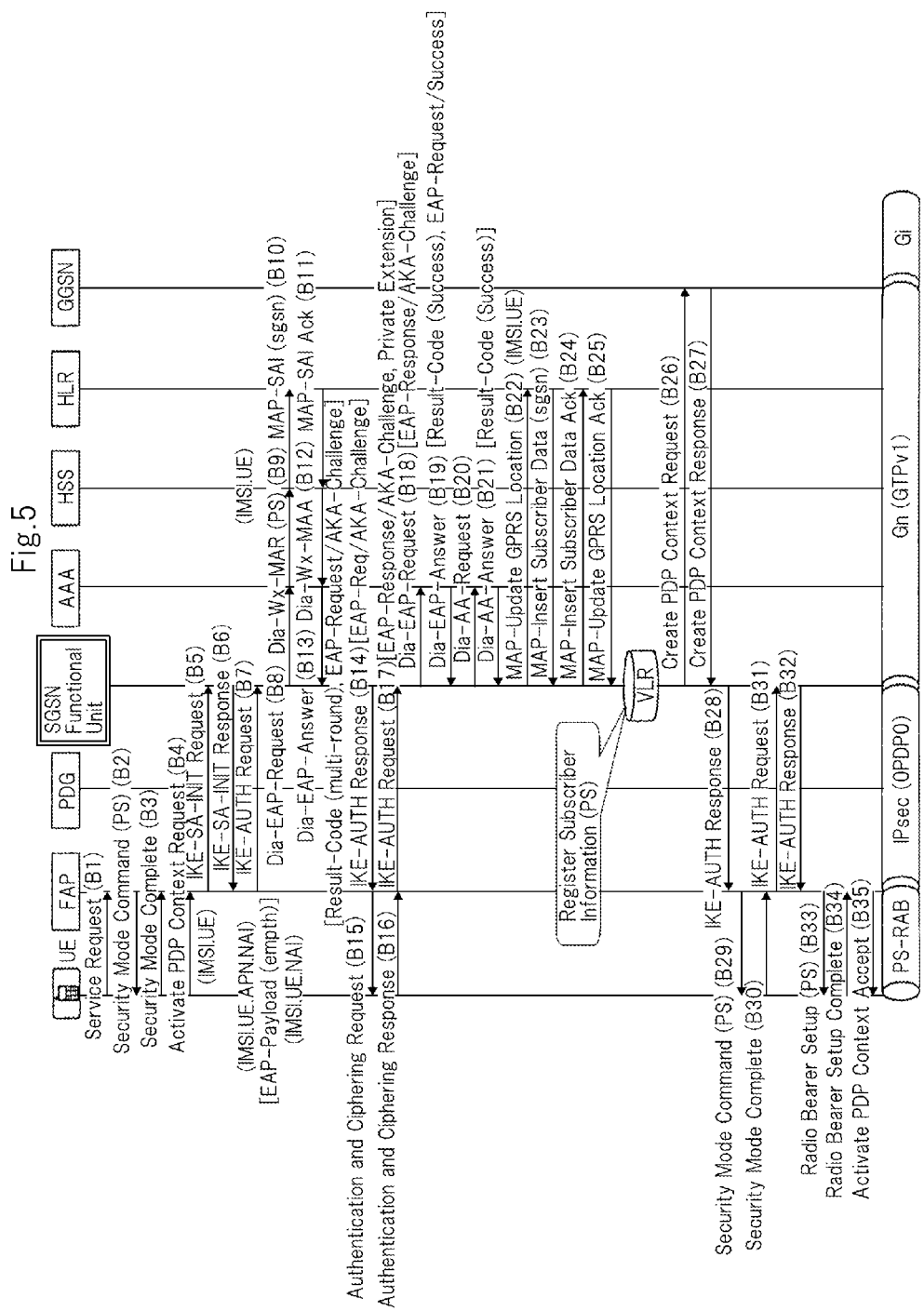
FIG. 5 is a diagram showing an example of a PS service processing operation on a Femto IMS network, showing an example of a processing operation at the time of PS transmission.

Referring next to FIGS. 2, 4 and 5, PS (Packet Switching) service performed on the IMS-Femto network will be described.

<Processing Operation Example at the Time of Location Registration for PS Service>

First, referring to FIGS. 2 and 4, a processing operation example at the time of performing location registration for PS service will be described.

UE transmits Attach Request to FAP (Step A1).

When receiving Attach Request, FAP transmits Identity Request to UE (Step A2).

When receiving Identity Request, UE transmits Identity Response to FAP (Step A3). Since UE transmits International Mobile Subscriber Identity.UE (IMSI.UE), by including it in Identity Response, FAP can acquire IMSI. UE. IMSI.UE is information for identifying UE.

When receiving Identity Response, FAP transmits IKE-SA-INIT Request to PDG (Step A4).

When receiving IKE-SA-INIT Request, PDG transmits IKE-SA-INIT Response to FAP (Step A5).

When receiving IKE-SA-INIT Response, FAP transmits IKE-AUTH Request to PDG (Step A6). FAP transmits APN (Access Point Name) and NAI (Network Access Identifier), by including them in IKE-Auth Request.

Since FAP has received Attach Request from UE at Step A1, FAP determines a location registration for PS service is requested, and transmits NAI that represents "OPSO<UE_IMSI>/<Femto_IMSI>@realmname" to PDG. "OPSO" is information that denotes the effect of requesting location registration for PS service. "<UE_IMSI>" is information for identifying UE, and is IMSI.UE that is included in the IDENTITY Response received at Step A3. "<Femto_IMSI>" is information for identifying FAP.

When receiving IKE-AUTH Request, PDG transmits Dia-EAP-Request to AAA (Step A7). PDG transmits NAI included in IKE-AUTH Request, by including it in Dia-EAP-Request.

When receiving Dia-EAP-Request, AAA transmits Dia-Wx-MAR to HSS (Step A8). Based on NAI included in Dia-EAP-Request, AAA determines whether the request is a location registration request for CS service, a location registration request for PS service, or a request for PDP Activate. In this case, because NAI represents "OPSO<UE_IMSI>/<Femto_IMSI>@realmname", AAA determines that the request is a location registration registering request for PS service, and transmits IMSI.UE indicated by NAI included in Dia-EAP-Request, by including it in Dia-Wx-MAR.

When receiving Dia-Wx-MAR, HSS transmits MAP-SAI to HLR (Step A9). HSS transmits IMSI.UE included in Dia-Wx-MAR, by including it in MAP-SAI.

When receiving MAP-SAI, HLR transmits MAP-SAI Ack to HSS (Step A10). HLR acquires RAND/AUTN/CK/IK/XRES corresponding to IMSI.UE included in MAP-SAI, and transmits the acquired RAND/AUTN/CK/IK/XRES by including them in MAP-SAI Ack. RAND/AUTN/CK/IK/XRES is information conforming to 3GPP. RAND denotes Random challenge. AUTN denotes Authentication Token. CK denotes Cipher Key. IK denotes Integrity Key. XRES denotes Expected RESponse.

It is assumed in the present processing operation that HLR transmits RAND/AUTN/CK/IK/XRES by including it in MAP-SAI Ack (EAP-AKA authentication). However, HLR may transmit RAND/AUTN/KC/RES by including them in MAP-SAI Ack (EAP-SIM authentication). HLR selects either EAP-AKA authentication (UMTS authentication) or EAP-SIM authentication (GSM authentication), in accordance with the capacity of the NW to which UE is contracted.

When receiving MAP-SAI Ack, HSS transmits Dia-Wx-MAA to AAA (Step A11). HSS transmits RAND/AUTN/CK/IK/XRES included in MAP-SAI Ack by including them in Dia-Wx-MAA.

When receiving Dia-Wx-MAA, AAA transmits Dia-EAP-Answer to PDG (Step A12). AAA transmits RAND/AUTN/CK/IK included in Dia-Wx-MAA, by including them in Dia-EAP-Answer.

When receiving Dia-EAP-Answer, PDG transmits IKE-AUTH Response to FAP (Step A13). PDG transmits EAP-Request/AKA-Challenge and RAND/AUTN/CK/IK included in Dia-EAP-Answer, by including them in IKE-AUTH Response. AKA denotes Authentication and Key Agreement.

When receiving IKE-AUTH Response, FAP transmits Authentication and Ciphering Request to UE (Step A14). FAP transmits RAND/AUTN included in IKE-AUTH Response, by including them in Authentication and Ciphering Request.

When receiving Authentication and Ciphering Request, UE transmits Authentication and Ciphering Response to FAP (Step A15). When receiving Authentication and Ciphering Request, UE performs an authentication operation based on RAND/AUTN included in the Authentication and Ciphering Request. The authentication operation is performed using a method conforming to 3GPP. UE calculates RES and transmits Authentication and Ciphering Response including the calculated RES to FAP. Calculation of RES is performed using a method conforming to 3GPP.

When receiving Authentication and Ciphering Response, FAP transmits IKE-AUTH Request to PDG (Step A16). FAP transmits EAP-Response/AKA-Challenge and RES included in Authentication and Ciphering Response, by including them in IKE-AUTH Request.

When receiving IKE-AUTH Request, PDG transmits Dia-EAP-Request to AAA (Step A17). PDG calculates MAC (Message Authentication Code) and transmits RES and MAC by including them in Dia-EAP-Request. Calculation of MAC is performed using a method conforming to 3GPP.

When receiving Dia-EAP-Request, AAA transmits Dia-EAP-Answer to PDG (Step A18).

When receiving Dia-EAP-Request, AAA performs UE authentication, and transmits EAP-Success by including it in Dia-EAP-Answer if UE authentication has succeeded.

When receiving Dia-EAP-Answer, PDG transmits Dia-AA-Request to AAA (Step A19). PDG transmits APN by including it in Dia-AA-Request.

When receiving Dia-AA-Request, AAA transmits Dia-AA-Answer to PDG (Step A20). AAA transmits IMSI.UE by including it in Dia-AA-Answer.

When receiving Dia-AA-Answer, PDG transmits IKE-AUTH-Response to FAP (Step A21). PDG transmits EAP-Success by including it in IKE-AUTH-Response.

When receiving IKE-AUTH-Response, FAP transmits IKE-AUTH-Request to PDG (Step A22).

When receiving IKE-AUTH-Request, PDG transmits IKE-AUTH-Response to FAP (Step A23). As a result, IPsec Tunnel is established between FAP and PDG.

FAP transmits INFORMATIONAL Request to PDG (Step A24).

When receiving INFORMATIONAL Request, PDG transmits INFORMATIONAL Response to FAP (Step A25). PDG also transmits Dia-ST-Request to AAA (Step A26).

When receiving Dia-ST-Request, AAA transmits Dia-ST-Answer to FAP (Step A27).

When receiving Dia-ST-Answer, FAP releases IPsec Tunnel. FAP also transmits Security Mode Command to UE (Step A28).

When receiving Security Mode Command, UE transmits Security Mode Complete to FAP (Step A29).

When receiving Security Mode Complete, FAP transmits Attach Accept to UE (Step A30).

When receiving Attach Accept, UE transmits Attach Complete to FAP (Step A31).

<Processing Operation Example at the Time of PS Transmission>

Referring next to FIGS. 2 and 5, an example of a processing operation at the time of PS transmission will be described.

First, UE transmits Service Request to FAP (Step B1).

When receiving Service Request, FAP transmits Security Mode Command (PS) to UE (Step B2).

When receiving Security Mode Command (PS), UE transmits Security Mode Complete to FAP (Step B3). UE also transmits Activate PDP Context Request to FAP (Step B4). UE transmits IMSI.UE, by including it in Activate PDP Context Request. The IMSI.UE is information for identifying UE.

When receiving Activate PDP Context Request, FAP transmits IKE-SA-INIT Request to the SGSN functional unit (Step B5).

When receiving IKE-SA-INIT Request, the SGSN functional unit transmits IKE-SA-INIT Response to FAP (Step B6).

When receiving IKE-SA-INIT Response, FAP transmits IKE-AUTH Request to the SGSN functional unit (Step B7). FAP transmits APN (Access Point Name) and NAI (Network Access Identifier), by including them in IKE-Auth Request.

Since FAP has received Activate PDP Context Request from UE at Step B4, FAP determines that the request is a PDP Activate request, and transmits NAI that represents "OPDPO<UE_IMSI>/<Femto_IMSI>@realmname" to the SGSN functional unit. "OPDPO" is information that denotes the effect of requesting PDP Activate. "<UE_IMSI>" is information for identifying UE, and is IMSI.UE that is included in the Activate PDP Context Request received at Step B4. "<Femto_IMSI>" is information for identifying FAP.

When receiving IKE-AUTH Request, the SGSN functional unit transmits Dia-EAP-Request to AAA (Step B8). The SGSN functional unit transmits NAI included in IKE-AUTH Request, by including it in Dia-EAP-Request. The SGSN functional unit transmits EAP-Payload (Empty), by including it in Dia-EAP-Request.

When receiving Dia-EAP-Request, AAA transmits Dia-Wx-MAR (PS) to HSS (Step B9).

Since NAI included in Dia-EAP-Request represents "OPDPO<UE_IMSI>/<Femto_IMSI>@realmname", AAA determines that the request is a PDP Active request, and transmits IMSI.UE of NAI included in Dia-EAP-Request, by including it in Dia-Wx-MAR.

When receiving Dia-Wx-MAR (PS), HSS transmits MAP-SAI (sgsn) to HLR (Step B10). HSS transmits IMSI.UE included in Dia-Wx-MAR (PS), by including it in MAP-SAI (sgsn).

When receiving MAP-SAI (sgsn), HLR transmits MAP-SAI Ack to HSS (Step B11). HLR acquires RAND/AUTN/CK/IK/XRES corresponding to IMSI.UE included in MAP-SAI (sgsn), and transmits the acquired RAND/AUTN/CK/IK/XRES by including them in MAP-SAI Ack.

When receiving MAP-SAI Ack, HSS transmits Dia-Wx-MAA to AAA (Step B12). HSS transmits RAND/AUTN/CK/IK/XRES included in MAP-SAI Ack by including them in Dia-Wx-MAA.

When receiving Dia-Wx-MAA, AAA transmits Dia-EAP-Answer to the SGSN functional unit (Step B13). AAA transmits Result-Code (multi-round) and EAP-Request/AKA-Challenge, by including them in Dia-EAP-Answer.

When receiving Dia-EAP-Answer, the SGSN functional unit transmits IKE-AUTH Response to FAP (Step B14). The SGSN functional unit transmits EAP-Request/AKA-Challenge, by including it in IKE-AUTH Response.

When receiving Dia-EAP-Answer, FAP transmits Authentication and Ciphering Request to UE (Step B15).

When receiving Authentication and Ciphering Request, UE transmits Authentication and Ciphering Response to FAP (Step B16).

When receiving Authentication and Ciphering Response, FAP transmits IKE-AUTH Request to the SGSN functional unit (Step B17). FAP transmits EAP-Response/AKA-Challenge and Private Extension, by including them in IKE-AUTH Request.

When receiving IKE-AUTH Request, the SGSN functional unit transmits Dia-EAP-Request to AAA (Step B18). The SGSN functional unit transmits EAP-Response/AKA-Challenge by including it in Dia-EAP-Request.

When receiving Dia-EAP-Request, AAA transmits Dia-EAP-Answer to the SGSN functional unit (Step B19). AAA transmits Result-Code (Success) and EAP-Request/Success by including them in Dia-EAP-Answer.

When receiving Dia-EAP-Answer, the SGSN functional unit transmits Dia-AA-Request to AAA (Step B20).

When receiving Dia-AA-Request, AAA transmits Dia-AA-Answer to the SGSN functional unit (Step B21). AAA transmits Result-Code (Success) by including it in Dia-AA-Answer.

When receiving Dia-AA-Answer, the SGSN functional unit transmits MAP-Update GPRS Location to HLR (Step B22). The SGSN functional unit transmits IMSI.UE, by including it in MAP-Update GPRS Location.

When receiving MAP-Update GPRS Location, HLR transmits MAP-Insert Subscriber Data to the SGSN functional unit (Step B23). HLR transmits subscriber information (for PS) corresponding to IMSI.UE included in MAP-Update GPRS Location, by including it in MAP-Insert Subscriber Data.

When receiving MAP-Insert Subscriber Data, the SGSN functional unit transmits MAP-Insert Subscriber Data Ack to HLR (Step B24).

When receiving MAP-Insert Subscriber Data Ack, HLR transmits MAP-Update GPRS Location Ack to the SGSN functional unit (Step B25). As a result, the SGSN functional unit can register the UE's subscriber information (for PS) acquired from HLR to VLR of the SGSN functional unit and manage it.

When receiving MAP-Update GPRS Location Ack, the SGSN functional unit transmits Create PDP Context Request to GGSN (Step B26).

When receiving Create PDP Context Request, GGSN transmits Create PDP Context Response to the SGSN functional unit (Step B27).

When receiving Create PDP Context Response, the SGSN functional unit transmits IKE-AUTH Response to FAP (Step B28).

When receiving IKE-AUTH-Response, FAP transmits Security Mode Command (PS) to UE (Step B29).

When receiving Security Mode Command (PS), UE transmits Security Mode Complete to FAP (Step B30).

When receiving Security Mode Complete, FAP transmits IKE-AUTH-Request to the SGSN functional unit (Step B31).

When receiving IKE-AUTH-Request, the SGSN functional unit transmits IKE-AUTH-Response to FAP (Step B32).

When receiving IKE-AUTH-Response, FAP transmits Radio Bearer Setup to UE (Step B33).

When receiving Radio Bearer Setup, UE transmits Radio Bearer Setup Complete to FAP (Step B34).

When receiving Radio Bearer Setup Complete, FAP transmits Activate PDP Context Accept to UE (Step B35).

Figure 6:
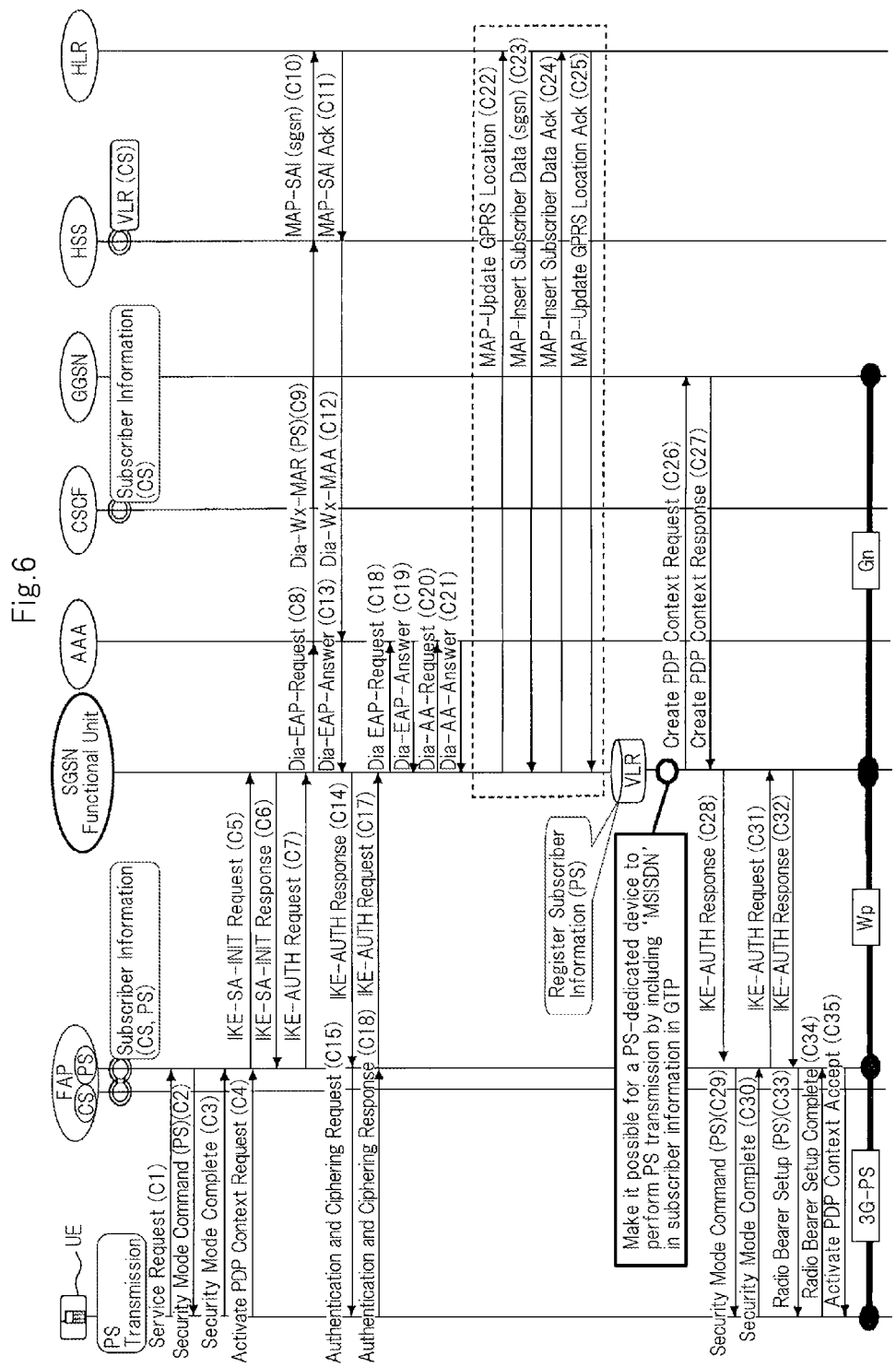
FIG. 6 is a diagram showing an example of a PS service processing operation on a Femto IMS network, showing an example of a processing operation when UE is a PS-dedicated device.

In this way, in the communication system of the present exemplary embodiment, when location registration for PS service is performed, messages are transmitted and received between UE, FAP, PDG, AAA, HSS and HLR to perform a UE authorization process, as shown in FIG. 4. On the other hand, in the communication system of the present exemplary embodiment, when PS transmission is carried out, messages are transmitted and received between UE, FAP, the SGSN functional unit, AAA, HSS and HLR to perform a UE authorization process, as shown in FIG. 5. When authorization of UE has succeeded, the SGSN functional unit acquires the UE's subscriber information (for PS) from HLR, and registers the acquired UE's subscriber information (for PS) in VLR and its management. Then, based on the UE's subscriber information (for PS) managed at VLR, PS additional service similar to that of the existing 3G network is performed. Here, as shown in FIG. 6, the PS additional service when UE is a PS-dedicated device is also carried out in the same processing operation as described with FIG. 5, and it is possible with the PS-dedicated device to perform PS transmission by including MSISDN (Mobile Station International Subscriber Directory Number) included in the subscriber information (for PS) which the SGSN functional unit has acquired from HLR, into GTP (GPRS Tunnelling protocol). Here, the above-described processing operation shown in FIG. 5 is carried out when UE is a general one, whereas the processing operation shown in FIG. 6 is done when UE is a PS-dedicated device. In the case of a general UE, subscriber information for CS and subscriber information for PS are managed by HLR, whereas the subscriber information for PS alone is managed by HLR when UE is PS-dedicated device.

Accordingly, the processing operation at the time of PS additional service for a general UE and that for a PS-dedicated device are carried out in approximately the same manner as shown in FIGS. 5 and 6, except that the subscriber information managed at HRL is different between the case of a general UE and the case of a PS-dedicated device.

The PS additional service means a PS service among PS services standardized in 3GPP, which is performed using the subscriber information (for PS) acquired from HLR by SGSN. For example, an APN-Selection function can be considered. It is assumed that the SGSN functional unit acquires UE's subscriber information (for PS) from HLR and manages the UE's subscriber information (for PS) as shown in FIG. 7 at VLR. In this case, the SGSN functional unit permits specific service A and specific service B when the subscriber information of APN received from UE indicates subscriber A. When the subscriber information of APN received from UE denotes subscriber B, the SGSN functional unit permits specific service A and restrains specific service B by the APN-Selection function. When the subscriber information of APN received from UE denotes subscriber E, the SGSN functional unit restrains specific service A by the APN-Selection function and permits specific service B. When the subscriber information of APN received from UE denotes subscriber H, the SGSN functional unit restrains both specific services A and B by the APN-Selection function. In this way, the SGSN functional unit acquires the UE's subscriber information (for PS) from HLR and registers the UE's subscriber information in VLR and management, whereby it is possible to perform PS additional service elaborately for each subscriber. As the PS additional service, Qos control and others can be considered other than the above-described APN-Selection function.

Operation and Effect of the Communication System of the Present Exemplary Embodiment As described heretofore, in the communication system of the present exemplary embodiment, a SGSN functional unit is provided between FAP and AAA, separately from PDG. Also, in the communication system of the present exemplary embodiment, at the time of performing location registration for PS service, messages are transmitted and received between UE, FAP, PDG, AAA, HSS and HLR to perform authorization of UE. Further, in the communication system of the present exemplary embodiment, at the time of PS transmission, messages are transmitted and received between UE, FAP, the SGSN functional unit, AAA, HSS and HLR to acquire the UE's subscriber information (for PS) from HLR and register the acquired UE's subscriber information (for PS) in VLR of the SGSN functional unit and its management, so that PS additional service similar to that of the existing 3G network is performed based on the UE's subscriber information (for PS) registered in VLR. As result, it is possible to perform PS additional service similar to that of the existing 3G network, also in a Femto IMS network communication system introduced with a FAP using an IMS network.

Second Exemplary Embodiment

Next, the second exemplary embodiment will be described.

In the first exemplary embodiment, a SGSN functional unit is provided between FAP and AAA, separately from PDG, as shown in FIG. 2.

Figure 8:
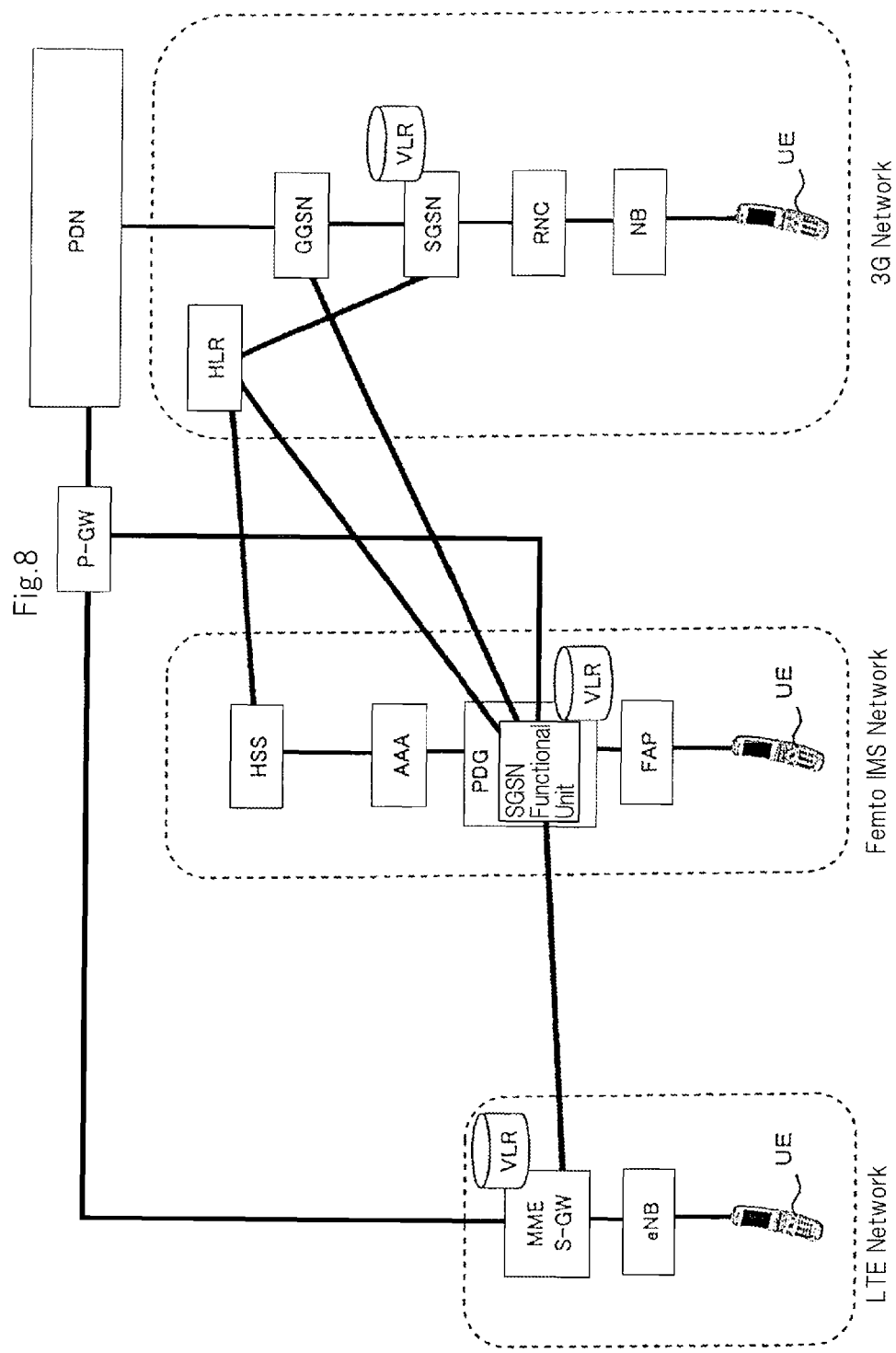
FIG. 8 is a diagram showing a system configuration example of a communication system of the second exemplary embodiment of the present invention, showing a configuration example where a SGSN functional unit is provided in a PDG.

On the other hand, in the present exemplary embodiment, a SGSN functional unit is provided in PDG as shown in FIG. 8, so as to perform the same processing operation as in the first embodiment shown in FIGS. 4 to 6. That is, the SGSN functional unit provided in PDG acquires UE's subscriber information (for PS) from HLR, and registers the acquired UE's subscriber information (for PS) in VLR of the SGSN functional unit and manages it, and performs PS additional service similar to that of the existing 3G network using the UE's subscriber information (for PS) registered in VLR.

In this case, based on NAI included in the message received from FAP, PDG determines whether the request is a location registration request for CS service, a location registration request for PS service, or a request for PDP Activate. When NAI represents "OCSO<UE_IMSI>/<Femto_IMSI>@realmname", PDG determines that the request is a location registration request for CS service, and performs the processing operation for CS service. When NAI represents "OPSO<UE_IMSI>/<Femto_IMSI>@realmname", PDG determines that the request is a location registration request for PS service, and performs the processing operation shown in FIG. 4. When NAI represents "OPDPO<UE_IMSI>/<Femto_IMSI>@realmname", PDG determines that the request is a request for PDP Active, and performs the processing operation shown in FIG. 5 in the case of a general UE and performs the processing operation shown in FIG. 6 in the case of a PS-dedicated device. As a result, it is possible to perform processing operations shown in FIGS. 4 to 6 even if the SGSN functional unit is provided in PDG.

Third Exemplary Embodiment

Next, the third exemplary embodiment will be described.

In the second exemplary embodiment, a SGSN functional unit is provided in PDG as shown in FIG. 8. At the time of PS transmission, the SGSN functional unit provided in PDG performs the processing operation shown in FIG. 5 and acquires UE's subscriber information (for PS) from HLR, and registers the acquired UE's subscriber information (for PS) in VLR of the SGSN functional unit and manages it, and performs PS additional service similar to that of the existing 3G network using the UE's subscriber information (for PS) registered in VLR.

Figure 9:
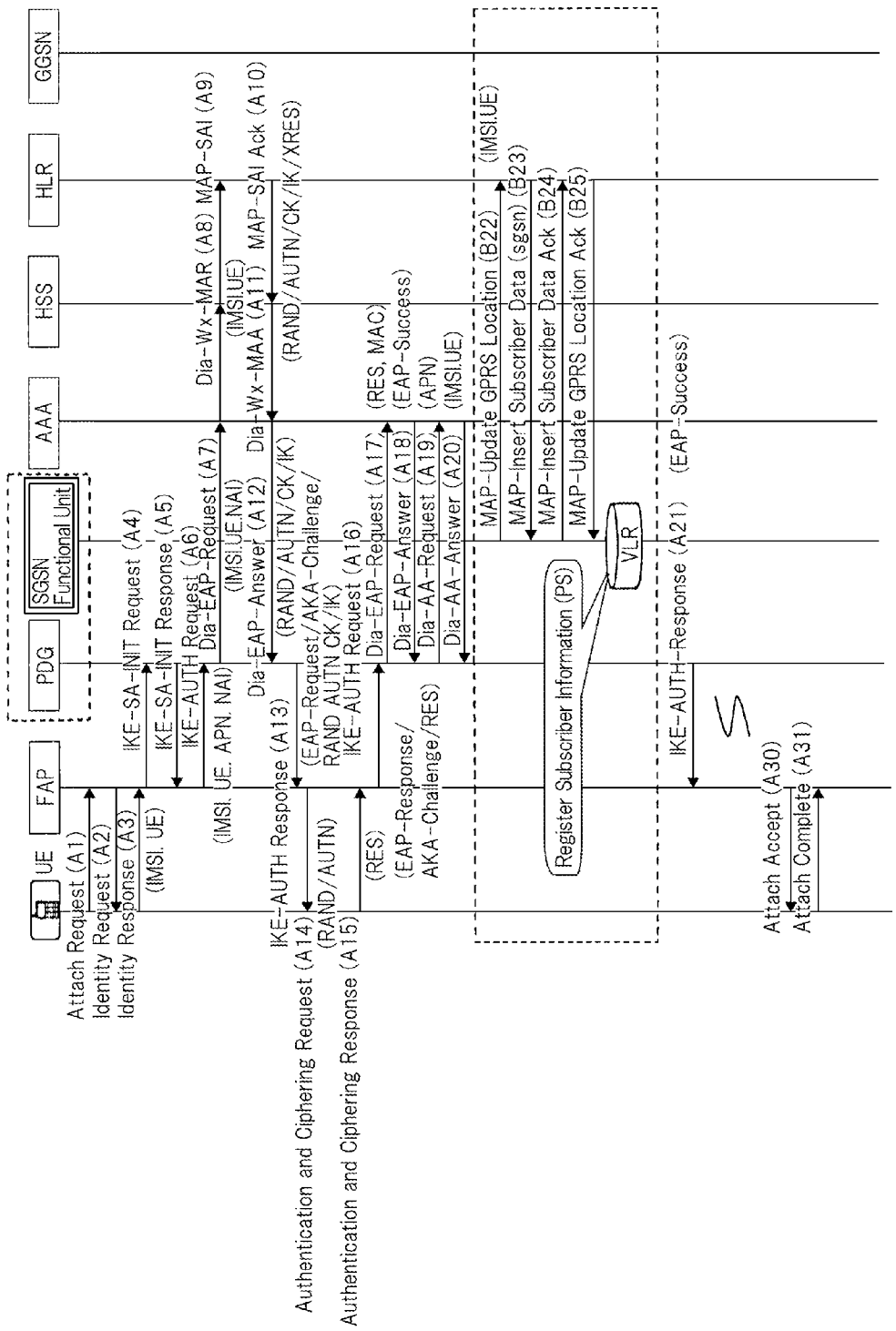
FIG. 9 is a diagram showing an example of a PS service processing operation on a Femto IMS network of the third exemplary embodiment, showing an example of a processing operation at the time of PS transmission.

On the other hand, in the present exemplary embodiment or the third exemplary embodiment, a SGSN functional unit is provided in PDG, as shown in FIG. 8. At the time of performing location registration for PS service, the SGSN functional unit provided in PDG performs the processing operation shown in FIG. 9 and acquires UE's subscriber information (for PS) from HLR, and registers the acquired UE's subscriber information (for PS) in VLR of the SGSN functional unit and manages it (Steps B22 to B25 shown in FIG. 9). In the present exemplary embodiment, the SGSN functional unit provided in PDG performs the processing operation shown in FIG. 10 at the time of PS transmission to perform PS additional service similar to that of the existing 3G network using the UE's subscriber information (for PS) which the SGSN functional unit registered to VLR (Step B26 to B35 shown in FIG. 10).

As a result, it is possible to acquire the UE's subscriber information (for PS) from HLR at the time of performing location registration for PS service and register the acquired UE's subscriber information (for PS) in VLR and its management.

Here the above exemplary embodiment is a preferred exemplary embodiment of the present invention, and the scope of the present invention should not be limited to the above exemplary embodiment alone, but various changes can be made without deviating from the gist of the present invention.

For example, the second and third exemplary embodiments were described taking a case where a SGSN functional unit is provided in PDG as shown in FIG. 8. However, provision of a SGSN functional unit in FAP also makes it possible to perform a processing operation similar to the second and third exemplary embodiments. Accordingly, the communication system of the present exemplary embodiment can be applied to construct various system configurations if PS additional service similar to that of the 3G network can be made possible by virtually structuring a SGSN functional unit using FAP and PDG shown in FIG. 1, by acquiring UE's subscriber information (for PS) from HLR and by registering the acquired UE's subscriber information (for PS) to VLR that is present on the Femto IMS network.

In the above-described communication system shown in FIG. 2, a single SGSN functional unit is provided for the Femto IMS network so that the SGSN functional unit on the IMS network can be recognized from MME S-GW, GGSN and P-GW, in the same manner as the SGSN on the 3G network is recognized. However, a plurality of SGSN functional units may be provided for the Femto IMS network and a plurality of SGSN functional units may be structured as a single SGSG functional unit group so that the SGSN functional unit group can be recognized from MME S-GW, GGSN and P-GW, in the same manner as the SGSN on the 3G network is recognized.

Further, in the communication system in the present exemplary embodiment, it is possible to perform processing without depending on the version of 3GPP.

The control operation in each apparatus that forms the communication system of the above-described exemplary embodiment, can be also be executed by hardware, software or by complex combination of hardware and software.

When the processing is executed using software, it is possible to install the program recorded with processing sequences in the memory of a computer built in dedicated hardware and make the computer execute the program. Alternatively, the program may be installed into a general-purpose computer that can execute each of the processes.

For example, the program may be recorded in advance in a hard disk or ROM (Read Only Memory) as a recording medium. Alternatively, the program may be stored (recorded) temporarily or permanently in a removable recording medium. Such a removable recording medium can be provided as so-called package software. Examples of the removable recording media include floppy (registered trademark) disks, CD-ROM (Compact Disc Read Only Memory), MO (magneto optical) disks, DVDs (Digital Versatile Disc), magnetic disks, semiconductor memories and the like.

Here, the program may be installed in the computer from a removable recording medium described above. Also, the program may be wirelessly transferred to the computer from a download site. Alternatively, the program may be wiredly transferred to the computer via a network.

The communication system in the present exemplary embodiment is not only configured to time-sequentially execute the progressing operations described in the above exemplary embodiments but can be also configured to execute the processing operations in parallel or individually, depending on the processing capacity of the apparatus to execute the process, or as needed.

Further, the communication system in the present exemplary embodiment may be configured of a logical set of multiple apparatuses, or may be configured of individual apparatuses residing in a single housing.

The whole or part of the above-described exemplary embodiments may be appended as the following notes, but should not be limited to these.

(Appended Note 1)

A service control apparatus comprising:

a registering means that acquires subscriber information for PS (Packet Switching) service on a UE (User Equipment) that is present in an area covered by a femtocell base station on an IMS (IP Multimedia subsystem) network, from a HLR (Home Location Register) and registers the subscriber information on a VLR (Visitor Location Register) that is on the IMS network; and a control means that performs PS service based on the subscriber information registered in the VLR.

(Appended Note 2)

The service control apparatus according to appended note 1, wherein the registering means acquires the subscriber information for PS service on the UE, from the HLR and registers the information in the VLR, at the time of performing location registration for PS service, or at the time of performing PS transmission.

(Appended Note 3)

A relay apparatus for relaying a message from a UE (User Equipment) that is present in the area covered by a femtocell base station on an IMS (IP Multimedia subsystem) network, to the core side, comprising:

a registering means that acquires subscriber information for PS (Packet Switching) service on the UE, from a HLR (Home Location Register) and registers the subscriber information in a VLR (Visitor Location Register) that is present on the IMS network; and a control means that performs PS service based on the subscriber information registered in the VLR.

(Appended Note 4)

A femtocell base station that is present on an IMS (IP Multimedia subsystem) network and transmits a message from a UE (User Equipment) to the core side, comprising:

a registering means that acquires subscriber information for PS (Packet Switching) service on the UE, from a HLR (Home Location Register) and registers the subscriber information to a VLR (Visitor Location Register) that is present on the IMS network.

(Appended Note 5)

A communication system forming an IMS network, including: a UE (User Equipment); a femtocell base station that transmits a message from the UE to the core side; a relay apparatus that relays the UE's message transmitted from the femtocell base station to the core side; and a service control apparatus that performs PS (Packet Switching) service for the UE, the service control apparatus comprises:

a registering means that acquires subscriber information for PS service on the UE from a HLR (Home Location Register), based on the UE's message transmitted from femtocell base station, and registers the subscriber information in a VLR (Visitor Location Register) that is present on the IMS network; and a control means that performs PS service based on the subscriber information registered in the VLR.

(Appended Note 6)

The communication system according to appended note 5, wherein the service control apparatus is provided in the femtocell base station or the relay apparatus.

(Appended Note 7)

A control method performed by a service control apparatus that performs PS (packet Switching) service for a UE (User Equipment) that is present in an area covered by a femtocell base station on an IMS (IP Multimedia subsystem) network, comprising the steps of:

a registering step of acquiring subscriber information for PS service on the UE and registering the subscriber information in a VLR (Visitor Location Register) that is present on the IMS network; and a control step of performing PS service based on the subscriber information registered in the VLR.

(Appended Note 8)

A program that causes a computer to execute:

a registering process of acquiring subscriber information for PS (Packet Switching) service on a UE (User Equipment) that is present in the area covered by a femtocell base station on an IMS (IP Multimedia subsystem) network, from a HLR (Home Location Register) and registering the subscriber information in a VLR (Visitor Location Register) that is present on the IMS network; and a control process of performing PS service based on the subscriber information registered in the VLR.

Although the present invention has been explained with reference to the exemplary embodiments, the present invention should not be limited to the above exemplary embodiments of the invention. Various modifications that can be understood by those skilled in the art may be made to the structures and details of the present invention within the scope of the present invention.

This application claims priority based on Japanese Patent Application No. 2011-139453, filed on Jun. 23, 2011, and should incorporate all the disclosure thereof herein.

INDUSTRIAL APPLICABILITY

The present invention can be applied to service using a femtocell base station.

The invention claimed is:

1. A service control apparatus comprising:
a registering means that acquires subscriber information for PS (Packet Switching) service on a UE (User Equipment) that is present in an area covered by a femtocell base station on an IMS (IP Multimedia subsystem) network, from a HLR (Home Location Register) and registers the subscriber information in a VLR (Visitor Location Register) that is present on the IMS network; and
a control means that is directly connected to a GGSN (Gateway GPRS Support Node) on a 3G network and a P-GW (PDN-Gateway) and that performs PS service based on the subscriber information registered in the VLR,
wherein the control means is configured to determine whether the UE is a PS-dedicated device, and in response to the UE being a PS-dedicated device, the control means causes the PS-dedicated device to perform a PS transmission by including, a Mobile Station International Subscriber Directory Number (MSISDN), which is included in the subscriber information acquired from the HLR, in a GPRS Tunneling protocol (GTP).

2. The service control apparatus according to claim 1, wherein said registering means acquires the subscriber information for PS service on the UE, from the HLR and registers the information in the VLR, at the time of performing location registration for PS service, or at the time of performing PS transmission.

3. A relay apparatus for relaying a message from a UE (User Equipment) that is present in an area covered by a femtocell base station on an IMS (IP Multimedia subsystem) network, to the core side, comprising:

a registering means that acquires subscriber information for PS (Packet Switching) service on the UE, from a HLR (Home Location Register) and registers the subscriber information in a VLR (Visitor Location Register) that is present on the IMS network; and a control means that is directly connected to a GGSN (Gateway GPRS Support Node) on a 3G network and a P-GW (PDN-Gateway) and that performs PS service based on the subscriber information registered in the VLR, wherein the control means is configured to determine whether the UE is a PS-dedicated device, and in response to the UE being a PS-dedicated device, the control means causes the PS-dedicated device to perform a PS transmission by including, a Mobile Station International Subscriber Directory Number (MSISDN), which is included in the subscriber information acquired from the HLR, in a GPRS Tunneling protocol (GTP).

4. A femtocell base station that is present on an IMS (IP Multimedia subsystem) network and transmits a message from a UE (User Equipment) to the core side, comprising:

a registering means that acquires subscriber information for PS (Packet Switching) service for the UE, from a HLR (Home Location Register) and registers the subscriber information in a VLR (Visitor Location Register) that is present on the IMS network, a control means that is directly connected to a GGSN (Gateway GPRS Support Node) on a 3G network and a P-GW (PDN-Gateway) and that performs PS service based on the subscriber information registered in the VLR, wherein the control means is configured to determine whether the UE is a PS-dedicated device, and in response to the UE being a PS-dedicated device, the control means causes the PS-dedicated device to perform a PS transmission by including, a Mobile Station International Subscriber Directory Number (MSISDN), which is included in the subscriber information acquired from the HLR, in a GPRS Tunneling protocol (GTP).

5. A communication system forming an IMS network, including: a UE (User Equipment); a femtocell base station that transmits a message from the UE to the core side; a relay apparatus that relays the UE's message transmitted from the femtocell base station to the core side; and a service control apparatus that performs PS (Packet Switching) service for the UE, characterized in that the service control apparatus comprises:

a registering means that acquires subscriber information for PS service on the UE from a HLR (Home Location Register), based on the UE's message transmitted from femtocell base station, and registers the subscriber information in a VLR (Visitor Location Register) that is present on the IMS network; and a control means that is directly connected to a GGSN (Gateway GPRS Support Node) on a 3G network and a P-GW (PDN-Gateway) and that performs PS service based on the subscriber information registered in the VLR, wherein the control means is configured to determine whether the UE is a PS-dedicated device, and in response to the UE being a PS-dedicated device, the control means causes the PS-dedicated device to perform a PS transmission by including, a Mobile Station International Subscriber Directory Number (MSISDN), which is included in the subscriber information acquired from the HLR, in a GPRS Tunneling protocol (GTP).

6. The communication system according to claim 5, wherein said service control apparatus is provided in the femtocell base station or the relay apparatus.

7. A control method performed by a service control apparatus that performs PS (packet Switching) service for a UE (User Equipment) that is present in an area covered by a femtocell base station on an IMS (IP Multimedia subsystem) network, comprising the steps of:

a registering step of acquiring subscriber information for PS service on the UE and registering the subscriber information in a VLR (Visitor Location Register) that is present on the IMS network; and a control step including a control means that is directly connected to a GGSN (Gateway GPRS Support Node) on a 3G network and a P-GW (PDN-Gateway) that performs PS service based on the subscriber information registered in the VLR, wherein the control means is configured to determine whether the UE is a PS-dedicated device, and in response to the UE being a PS-dedicated device, the control means causes the PS-dedicated device to perform a PS transmission by including, a Mobile Station International Subscriber Directory Number (MSISDN), which is included in the subscriber information acquired from a HLR (Home Location Register), in a GPRS Tunneling protocol (GTP).

8. A non-transitory computer-readable recording medium having stored thereon a program that causes a computer to execute:

a registering process of acquiring subscriber information for PS (Packet Switching) service for a UE (User Equipment) that is present in the area covered by a femtocell base station on an IMS (IP Multimedia subsystem) network, from a HLR (Home Location Register) and registering the subscriber information in a VLR (Visitor Location Register) that is present on the IMS network; and a control process including a control means that is directly connected to a GGSN (Gateway GPRS Support Node) on a 3G network and a P-GW (PDN-Gateway) that performs PS service based on the subscriber information registered in the VLR, wherein the control means is configured to determine whether the UE is a PS-dedicated device, and in response to the UE being a PS-dedicated device, the control means causes the PS-dedicated device to perform a PS transmission by including, a Mobile Station International Subscriber Directory Number (MSISDN), which is included in the subscriber information acquired from the HLR, in a GPRS Tunneling protocol (GTP).

* * * * *